US008014279B2

(12) United States Patent  (10) Patent No.: US 8,014,279 B2
Park et al. (45) Date of Patent: Sep. 6, 2011

(54) COMMUNICATION SCHEDULING OF NETWORK NODES

(75) Inventors: Sung Park, Irvine, CA (US); Darryn A. Johnnie, Brea, CA (US); Michael A. Born, Los Alamitos, CA (US); Colleen M. Touchard, Corona, CA (US); Keith C. Buerger, Fullerton, CA (US); Tyler J. Ulinskas, San Diego, CA (US)

(73) Assignee: Raytheon Company, Waltham, MA (US)

( * ) Notice: Subject to any disclaimer, the term of this patent is extended or adjusted under 35 U.S.C. 154(b) by 901 days.

(21) Appl. No.: 11/842,998

(22) Filed: Aug. 22, 2007

(65) Prior Publication Data

US 2009/0052406 A1    Feb. 26, 2009

(51) Int. Cl.
    *G01R 31/08* (2006.01)
(52) U.S. Cl. .................... 370/230; 370/254; 370/336
(58) Field of Classification Search .......... 370/336, 370/337, 338, 458, 230, 254, 280, 310, 328, 370/329
    See application file for complete search history.

(56) References Cited

U.S. PATENT DOCUMENTS

| 6,901,064 | B2  | 5/2005  | Cain et al.      |
|-----------|-----|---------|------------------|
| 7,062,687 | B1  | 6/2006  | Gfeller et al.   |
| 7,082,111 | B2* | 7/2006  | Amouris ............ 370/321 |
| 7,177,295 | B1  | 2/2007  | Sholander et al. |
| 7,502,360 | B2  | 3/2009  | Liu et al.       |
| 7,610,059 | B2  | 10/2009 | Roy et al.       |
| 7,616,565 | B2  | 11/2009 | Park et al.      |
| 7,756,102 | B2* | 7/2010  | Aceves ............ 370/348 |
| 2002/0012337 | A1 | 1/2002 | Schmidl et al.   |
| 2002/0067736 | A1* | 6/2002 | Garcia-Luna-Aceves et al. ............ 370/442 |
| 2003/0067892 | A1 | 4/2003 | Beyer et al.     |
| 2003/0206561 | A1 | 11/2003 | Schmidl et al.  |
| 2003/0231588 | A1 | 12/2003 | Roth et al.     |
| 2006/0268879 | A1 | 11/2006 | Xhafa et al.    |

(Continued)

FOREIGN PATENT DOCUMENTS

EP    1 178 625 A    2/2002

(Continued)

OTHER PUBLICATIONS

Notification of Transmittal of the International Search Report and the Written Opinion of the International Searching Authority, or the Declaration, PCT/US2008/077331 dated Jan. 28, 2009.

(Continued)

*Primary Examiner* — Jung Park
(74) *Attorney, Agent, or Firm* — Daly, Crowley, Mofford & Durkee, LLP

(57) ABSTRACT

In one aspect, a method to schedule network communications includes transmitting a node identification associated with a first node joining a network over a first portion of control timeslots based on a first probability, detecting nodes in the network using a second portion of the control timeslots and receiving acknowledgments from at least one of the nodes in the network. The method also includes that if a ratio of a number of acknowledgments received to a number of the nodes in the network detected is greater than a predetermined percentage: transmitting control data over the first portion of the control timeslots based on a second probability associated with a number of the nodes detected and transmitting data over the second portion of the control timeslots based on a network schedule.

33 Claims, 10 Drawing Sheets

U.S. PATENT DOCUMENTS

| | | |
|---|---|---|
| 2007/0019594 A1 | 1/2007 | Perumal et al. |
| 2007/0104177 A1 | 5/2007 | Hwang et al. |
| 2007/0195817 A1 | 8/2007 | Denney et al. |
| 2008/0089398 A1 | 4/2008 | Cormier et al. |
| 2008/0198815 A1 | 8/2008 | Liu |
| 2008/0205431 A1 | 8/2008 | Park et al. |
| 2009/0052406 A1 | 2/2009 | Park et al. |
| 2009/0054073 A1 | 2/2009 | Roy et al. |
| 2009/0086752 A1 | 4/2009 | Anderson et al. |
| 2010/0040079 A1 | 2/2010 | Park et al. |

FOREIGN PATENT DOCUMENTS

| | | |
|---|---|---|
| EP | 1371183 A1 | 12/2003 |
| JP | 2003 046595 A | 2/2003 |
| KR | 2002 0055285 | 7/2002 |
| WO | WO 0048367 A | 8/2000 |
| WO | WO 0128170 A | 4/2001 |
| WO | WO 01/28170 A | 1/2002 |
| WO | WO 03/090083 A1 | 10/2003 |
| WO | WO 2008/016495 A2 | 2/2008 |
| WO | WO 2009/046143 A2 | 4/2009 |

OTHER PUBLICATIONS

Notification of Transmittal of the International Search Report and the Written Opinion of the International Searching Authority, or the Declaration, PCT/US2009/067459 date of mailing Feb. 17, 2010, 7 pages.

Written Opinion of the International Searching Authority, PCT/US2009/067459 date of mailing Feb. 17, 2010, 7 pages.

Sung Park et al.: "Dynamic control slot scheduling algorithms for TDMA based Mobile Ad Hoc Networks", Military Communications Conference, 2008. Milcom 2008. IEEE, Piscataway, NJ. Nov. 16, 2008, 7 pages. XP031408374. ISBN: 978-1-4244-2676-8.

International Preliminary Report on Patentability (Form PCT/IB/326) and Written Opinion of the International Search Authority (Form PCT/ISA/237) for PCT/US2008/071407, dated Mar. 4, 2010, 12 pages.

Notification of Transmittal of the International Search Report and the Written Opinion of the International Searching Authority, or the Declaration, PCT/US2010/021719 dated Apr. 23, 2010, 5 pages.

Written Opinion of the International Searching Authority, PCT/US2010/021719 dated Apr. 23, 2010, 9 pages.

Haas Z J et al.: "Evaluation of the Ad-Hoc Connectivity with the Zone Routing Protocols", Proceedings of Annual Virginia Tech Symposium on Wireless Personal Communications, Jun. 10, 1998, pp. 201-212, XP008001971.

Chakeres Group Cengen C Perkins Wichorus I: "Dynamic MANET On-demand (DYMO) Routing; draft-ietf-manet-dymo-17.txt", Dynamic MANET On-Demand (DYMO) Routing; Draft-IETF-MANET-DYMO-17.TXT, Internet Engineering Task Force, IETF; Standardworkingdraft, Internet Society (ISOC) 4, Rue Des Falaises Ch- 1205, Geneva, Switzerland, vol. manet, No. 17, Mar. 8, 2009, XP015061015.

Bao L et al.: "A New Approach to Channel Access Scheduling for Ad Hoc Networks", Proceedings of the 7th Annual International Conference on Mobile Computing and Networking, MOBICOM 2001. Rome, Italy, Jul. 16-21, 2001 [Annual International Conference on Mobile Computing and Networking], New York, NY: ACM, US LNKD- DOI:10.1145/, vol. CONF. 7, Jul. 16, 2001, pp. 210-220, XP001072006, ISBN: 978-1-58113-422-3.

File downloaded from PAIR for U.S. Appl. No. 11/678,668, filed Feb. 26, 2007, file from Jan. 25, 2010 (last download) through May 7, 2010, 1 page.

File downloaded from PAIR for U.S. Appl. No. 12/508,747, filed Jul. 24, 2009, through May 7, 2010, (Section 1) 442 pages.

File downloaded from PAIR for U.S. Appl. No. 12/508,747, filed Jul. 24, 2009, through May 7, 2010, (Section 2) 321 pages.

File downloaded from PAIR for U.S. Appl. No. 12/508,747, filed Jul. 24, 2009, through May 7, 2010, (Section 3) 433 pages.

File downloaded from PAIR for U.S. Appl. No. 12/356,778, filed Jan. 21, 2009, through May 7, 2010, (Section 1) 536 pages.

File downloaded from PAIR for U.S. Appl. No. 12/356,778, filed Jan. 21, 2009, through May 7, 2010, (Section 2) 316 pages.

File downloaded from PAIR for U.S. Appl. No. 12/356,778, filed Jan. 21, 2009, through May 7, 2010, (Section 3) 498 pages.

File downloaded from PAIR for U.S. Appl. No. 12/425,753, filed Apr. 17, 2009, through May 11, 2010, (Section 1) 313 pages.

File downloaded from PAIR for U.S. Appl. No. 12/425,753, filed Apr. 17, 2009, through May 11, 2010, (Section 2) 314 pages.

File downloaded from PAIR for U.S. Appl. No. 12/425,753, filed Apr. 17, 2009, through May 11, 2010, (Section 3) 314 pages.

File downloaded from PAIR for U.S. Appl. No. 12/425,753, filed Apr. 17, 2009, through May 11, 2010, (Section 4) 310 pages.

Vaidya et al, "Distributed Fair Scheduling in a Wireless LAN", IEEE Trans. On Mobile Computing, vol. 4, No. 6, (Nov. 2005), pp. 616-629.

Shiann-Tsong et al., "A Bandwidth Allocation/Sharing/Extension Protocol for Multimedia Over IEEE 802.11 Ad Hoc Wireless LANs", IEEE Journal on Selected Areas in Communication, vol. 19, No. 10, (Oct. 2001), pp. 2065-2080.

Qi et al, "Ad hoc QoS on-demand routing (AQOR) in mobile ad hoc networks," Journal of Parallel and Distributed Computing 63, (2003), pp. 154-165.

Arthur Anderson, et al., "Method for Increasing the Successful Outcomes of a Fair Coin Flip Using a Node Weight Metric in a Communication System", U.S. Appl. No. 60/976,730, filed Oct. 1, 2007, 11 pages.

Sung I. Park et al., "Multicasting in a Network Using Neighbor Information", U.S. Appl. No. 61/089,135, filed Aug. 15, 2008 50 pages.

Sung I. Park et al., "Multicasting in a Network Using Neighbor Information", U.S. Appl. No. 12/508,747, filed Jul. 24, 2009 43 pages.

Notification of transmittal of the International Search Report dated Aug. 18, 2008 PCT/US2008/051276.

The International Search Report dated Aug. 18, 2008 PCT/US2008/051276.

Written Opinion of the International Searching Authority dated Aug. 18, 2008 PCT/US2008/051276.

Lichun Bao, et. al., "Channel Access Scheduling in Ad Hoc Networks with Unidirectional Links", Computer Science Dept. and Computer Engineering Dept., University of CA, Santa Cruz, CA, 10 pages.

Sung Park, et al., "Network Communication Scheduling", U.S. Appl. No. 11/678,668, filed Feb. 26, 2007.

Notification of Transmittal of the International Search Report and the Written Opinion of the International Searching Authority, or the Declaration dated Dec. 4, 2008, PCT/US2008/071407.

Lichun Bao: "MALS: multiple access scheduling based on Latin squares" Military Communications Conference, 2004. MILCOM 2004. 2004 IEEE Monterey, CA, USA Oct. 31-Nov. 3, 2004, Piscataway, NJ, USA, IEEE vol. 1, Oct. 31, 2004, pp. 315-321, XP010827102 ISBN: 987-0-7803-8847-5 whole document, in particular p. 320, left column, 2nd and 3rd paragraph.

Lichun Bao et al: "Hybrid channel access scheduling in ad hoc networks" Network Protocols, 2002. Proceedings. 10th IEEE International Conference on Nov. 12-15, 2002 Piscataway, NJ, USA, IEEE, Nov. 12, 2002, pp. 46-57, XP010632566 ISBN: 978-0-7695-1856-5, abstract, chapter 3.1.

Lichun Bao, et. al., "Channel Access Scheduling in Ad Hoc Networks with Unidirectional Links", Computer Science Dept. and Computer Engineering Dept., University of CA, 2001.

Sung Park, et al., "Network Communication Scheduling", U.S. Appl. No. 11/678,668, filed Feb. 26, 2007.

Daniel L. Cormier, et al., "Determining a Mode to Transmit Data", U.S. Appl. No. 11/548,763, filed Oct. 12, 2006.

Lichun Bao, et. al., "Hybrid Channel Access Scheduling in Ad Hoc Networks", Computer Science Dept. and Computer Engineering Dept., University of CA, 2002.

Notification Concerning Transmittal of International Preliminary Report on Patentability (Chapter 1 of the Patent Cooperation Treaty), PCT/US2008/051276 dated Sep. 3, 2009, 2 pages.

Written Opinion of the International Searching Authority, PCT/US2008/051276 dated Sep. 3, 2009, 5 pages.

Notification of Transmittal of the International Search Report and The Written Opinion of the International Searching Authority, or the Declaration, PCT/US2009/052366, dated Dec. 3, 2009, 6 pages.

Written Opinion of the International Searching Authority, PCT/US2009/052366, dated Dec. 3, 2009, 11 pages.

Notification of Transmittal of the International Search Report and the Written Opinion of the International Searching Authority, or the Declaration, PCT/US2007/021640 dated Jun. 20, 2008, 6 pages.

Written Opinion of the International Searching Authority, PCT/US2007/021640 dated Jun. 20, 2008, 10 pages.

Clausen et al., "Optimized Link State Routing Protocol (OLSR); rfc3626.txt" IETF Standard, Internet Engineering Task Force, IETF, CH, Oct. 1, 2003, XP015009408, ISSN: 0000-0003, 75 pages.

Qayyum et al., "Multipoint relaying for flooding broadcast messages in mobile wireless networks", System Sciences, 2001. HICSS. Proceedings of the 35$^{th}$ Annual Hawaii International Conference on Jan. 7-1-, 2001, Piscataway, NJ, USA, IEEE, Los Alamitos, CA, USA, Jan. 7, 2001, pp. 3898-3907, XP010587721, ISBN: 978-0-7695-1435-2, 10 pages.

Lim et al., "Flooding in Wireless Ad Hoc Networks", Computer Communications, Elsevier Science Publishers BV, Amsterdam, NL, vol. 24, No. 3-4, Feb. 15, 2001, pp. 353-363, XP004248987, ISSN: 0140-3664, 11 pages.

Peng et al., "AHBP: An Efficient Broadcast Protocol for Mobile Ad Hoc Networks", Journal of Computer Science and Technology, Science Press, Beijing, CN, vol. 16, No. 2, Mar. 1, 2001, pp. 114-125, XP008099976, ISSN: 1000-9000, 12 pages.

Bao et al., "A New Approach to Channel Access Scheduling for Ad Hoc Networks" Proceedings of the 7$^{th}$ Annual International Conference on Mobile Computing and Networking. Mobicom 2001. Rome, Italy, Jul. 16-21, 2001; [Annual International Conference on Mobile Computing and Networking], New York, NY: ACM, US, vol. Conf. 7, Jul. 16, 2001, pp. 210-220, XP001072006, ISBN: 978-1-58113-422-3, 11 pages.

File downloaded from PAIR: Sung Park et al., "Network Communication Scheduling", U.S. Appl. No. 11/678,668, filed Feb. 26, 2007, 448 pages. File downloaded from Dec. 30, 2008 through Dec. 14, 2009.

File downloaded from PAIR: Denh T. Sy, et al., "Communication Scheduling of Network Nodes Using a Cluster Coefficent", U.S. Appl. No. 12/356,778, filed Jan. 21, 2009, 727 pages. File through Dec. 14, 2009.

File downloaded fromn PAIR: Sung I, Park et al., "Multicasting in a Network Using Neighbor Information", U.S. Appl. No. 61/089,135, filed Aug. 15, 2008, 58 pages. File through Dec. 14, 2009.

File downloaded from PAIR: Sung I. Park et al., "Cross Layer Routing (XRP) Protocol", U.S. Appl. No. 12/425,753, filed Apr. 17, 2009, 549 pages. File through Dec. 14, 2009.

File downloaded from PAIR: Sung I. Park et al., "Multicasting in a Network Using Neighbor Information", U.S. Appl. No. 12/508,747, filed Jul. 24, 2009, 28 pages. File downloaded from Aug. 12, 2009 through Dec. 14, 2009.

Application downloaded from PAIR: Denh T. Sy, et al., "Communication Scheduling of Network Nodes Using a Cluster Coefficent", U.S. Appl. No. 12/356,778, filed Jan. 21, 2009, 40 pages.

Application downloaded from PAIR: Sung I. Park et al., "Cross Layer Routing (XRP) Protocol", U.S. Appl. No. 12/425,753, filed Apr. 17, 2009, 60 pages.

File downloaded from PAIR: Arthur Anderson et al., "Communication Scheduling of Network Nodes Using Fair Access and Weighting Techniques", U.S. Appl. No. 11/947,928, filed Nov. 30, 2007, through Dec. 16, 2009, 446 pages.

File downloaded from PAIR: Daniel R. Cormier et al., "Determining a Mode to Transmit Data", U.S. Appl. No. 11/548,763, filed Oct. 12, 2006, through Dec. 16, 2009, 373 pages.

European patent action dated Jan. 11, 2011 for European Patent Application No. 08796738.6, 5 pages.

* cited by examiner

|  | Timeslot 1 | Timeslot 2 | Timeslot 3 | Timeslot 4 |
|---|---|---|---|---|
| Node 12a | Receive | Receive | Receive | Receive |
| Node 12b | Transmit | Receive | Receive | Receive |
| Node 12c | Receive | Receive | Transmit | Receive |
| Node 12d | Receive | Transmit | Receive | Receive |
| Node 12e | Receive | Receive | Receive | Transmit |

|  | Timeslot 1 | Timeslot 2 | Timeslot 3 | Timeslot 4 |
|---|---|---|---|---|
| Node 12a | Receive | Receive | Receive | Receive |
| Node 12b | Transmit | Receive | Receive | Receive |
| Node 12c | Receive | Receive | Receive | Receive |
| Node 12d | Receive | Transmit | Receive | Receive |
| Node 12e | Receive | Receive | Receive | Transmit |

|  | Timeslot 1 | Timeslot 2 | Timeslot 3 | Timeslot 4 |
|---|---|---|---|---|
| Node 12a | Receive | Receive | VSLOT | Receive |
| Node 12b | Transmit | Receive | VSLOT | Receive |
| Node 12c | Receive | Receive | VSLOT | Receive |
| Node 12d | Receive | Transmit | VSLOT | Receive |
| Node 12e | Receive | Receive | VSLOT | Transmit |
| Node 12f | VSLOT | Transmit | Transmit | VSLOT |

| | Timeslot 1 | Timeslot 2 | Timeslot 3 | Timeslot 4 |
|---|---|---|---|---|
| Node 12a | Receive | Receive | VSLOT | Receive |
| Node 12b | Transmit | Receive | VSLOT | Receive |
| Node 12c | Receive | Receive | VSLOT | Receive |
| Node 12d | Receive | Transmit | VSLOT | Receive |
| Node 12e | Receive | Receive | VSLOT | Transmit |
| Node 12f | Receive | Receive | Transmit | VSLOT |
| Node 12g | Receive | Transmit | Receive | VSLOT |
| Node 12h | Transmit | Receive | Receive | VSLOT |

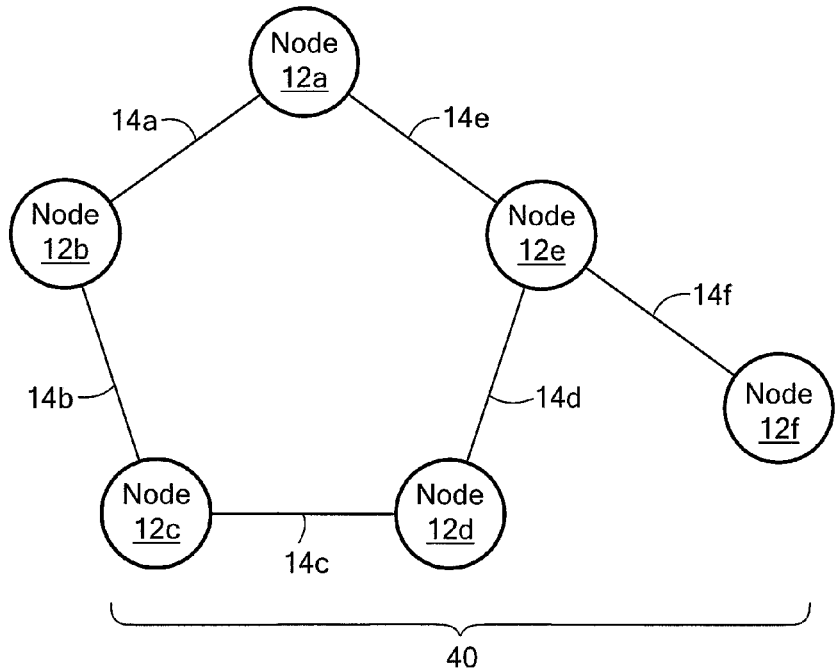

*FIG. 14*

| | Network Entry Control Timeslots 146a, 146b | Neighbor Control Timeslot 148a | Neighbor Control Timeslot 148b | Neighbor Control Timeslot 148c |
|---|---|---|---|---|
| Node 12a | Network Receive | Transmit | Receive | Receive |
| Node 12b | Network Receive | Receive | Receive | Receive |
| Node 12c | Network Receive | Receive | Receive | Receive |
| Node 12d | Network Receive | Receive | Transmit | Receive |
| Node 12e | Network Receive | Receive | Receive | Transmit |
| Node 12f | Network Transmit | Receive | Receive | Receive |

*FIG. 15*

COMMUNICATION SCHEDULING OF NETWORK NODES

BACKGROUND

In a shared network with multiple users sharing the same frequency, it is desirable to have only one user transmit data at a time. For example, if one user transmits data at the same time another user is transmitting data, collisions occur and data is generally corrupted and lost. One method to reduce collisions in the shared networks is to use time division multiple access (TDMA). TDMA enables several users to share the same frequency by dividing the use of the shared frequency into different timeslots, one user per timeslot. For example, the users transmit data in succession (i.e., one user transmit data after another user transmits data), each user using its own timeslot, so that only one user transmits data during a timeslot.

SUMMARY

In one aspect, a method to schedule network communications includes transmitting a node identification associated with a first node joining a network over a first portion of control timeslots based on a first probability, detecting nodes in the network using a second portion of the control timeslots and receiving acknowledgments from at least one of the nodes in the network. The method also includes that if a ratio of a number of acknowledgments received to a number of the nodes in the network detected is greater than a predetermined percentage: transmitting control data over the first portion of the control timeslots based on a second probability associated with a number of the nodes detected and transmitting data over the second portion of the control timeslots based on a network schedule.

In another aspect, an article includes a machine-readable medium that stores executable instructions to schedule network communications. The instructions cause a machine to transmit a node identification associated with a first node joining a network over a first portion of control timeslots based on a first probability, detect nodes in the network using a second portion of the control timeslots and to receive acknowledgments from at least one of the nodes in the network. If a ratio of a number of acknowledgments received to a number of the nodes in the network detected is greater than a predetermined percentage, the instructions cause a machine to transmit control data over the first portion of the control timeslots based on a second probability associated with a number of the nodes detected and to transmit data over the second portion of the control timeslots based on a network schedule.

In a further aspect, an apparatus to schedule network communications includes circuitry to transmit a node identification associated with a first node joining a network over a first portion of control timeslots based on a first probability, detect nodes in the network using a second portion of the control timeslots and to receive acknowledgments from at least one of the nodes in the network. If a ratio of a number of acknowledgments received to a number of the nodes in the network detected is greater than a predetermined percentage, circuitry to transmit control data over the first portion of the control timeslots based on a second probability associated with a number of the nodes detected and transmit data over the second portion of the control timeslots based on a network schedule.

A method to schedule communications in a network includes separating control slots into a first portion and a second portion. Each portion uses a different scheduling scheme. The method also includes limiting transmission in the control slots by a node based on a network topology consistency for the node.

DESCRIPTION OF THE DRAWINGS

FIG. 14 is a diagram of a communications network and a new node joining the network using the process in FIG. 13.

FIG. 15 is a table depicting an example of a network schedule for the nodes of FIG. 12 using control timeslots.

DETAILED DESCRIPTION

Figures 1, 2:
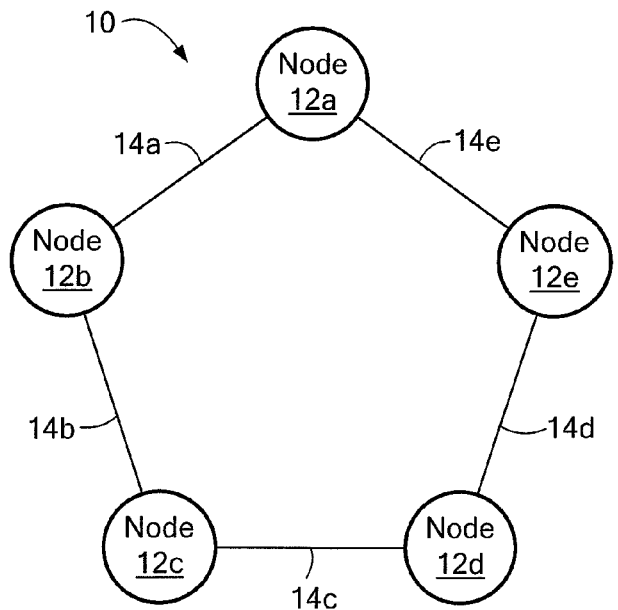
FIG. 1 is a prior art diagram of a communication network having nodes.
FIG. 2 is a prior art table indicating an example of network schedule of communications between the nodes of FIG. 1.

Referring to FIG. 1, a communications network 10 includes nodes (e.g., a first node 12a, a second node 12b, a third node 12c, a fourth node 12d and a fifth node 12e). In one example, the nodes 12a-12e are network routers. In another example, the nodes 12a-12e are wireless radios. The nodes 12a-12e are connected by links representing that the two nodes are within transmit/receive range of each other (e.g., a first link 14a connecting the first node 12a to the second node 12b, a second link 14b connecting the second node 12b to the third node 12c, a third link 14c connecting the third node 12c to the fourth node 12d, a fourth link 14d connecting the fourth node 12d to the fifth node 12e, and a fifth link 14e connecting the fifth node 12e to the first node 12a).

In one example, the links 14a-14e are wireless links. In another example, the links 14a-14e are wired links. In another example, links 14a-14e may be a combination of wireless and wired links. The communications network 10 may be any shared medium.

The first node 12a and the second node 12b are one hop away from each other (i.e., one-hop neighbors). One hop means that the shortest network path from the first node 12a to the second node 12b does not include any intervening nodes (i.e., one link). Likewise the second node 12b and the third node 12c; the third node 12c and the fourth node 12d; the fourth node 12d and the fifth node 12e; and the fifth node 12e and the first node 12a are all one-hop neighbors to each other.

The first node 12a and the third node 12c are two hops away from each other (i.e., two-hop neighbors). Two hops means that the shortest network path from the first node 12a to the third node 12c includes only one intervening node (the second node 12b) (i.e., two links). Likewise the second node 12b and the fourth node 12d; the third node 12c and the fifth node 12e; the fourth node 12d and the first node 12a; and the fifth node 12e and the second node 12b are all two-hop neighbors to each other.

A goal of network communications scheduling is to ensure that only one network node communicates at a time. For example, in a wireless network, if one node transmits data at the same time another node is transmitting data, collisions, which corrupt the data, will occur at a receiving node which is in wireless range of both transmitting nodes. One way used in the prior art to reduce collisions is to use time division multiplexing access (TDMA). One particular implementation of TDMA uses a Node Activation Multiple Access (NAMA) algorithm. NAMA is a wireless multiple access protocol designed to generate dynamic and collision-free TDMA timeslot scheduling. NAMA achieves collision-free TDMA timeslot scheduling by having nodes within one and two hops of each other participate in a cooperative random election process. Each node generates the same random algorithm to determine simultaneously which node transmits data for a particular timeslot.

For example, referring back to FIG. 1, the nodes 12a-12e implement an election process for four timeslots (e.g., timeslot 1, timeslot 2, timeslot 3 and timeslot 4). During each timeslot, each node 12a-12e in the network 10 determines a set of pseudo-random numbers based on each node's ID for those nodes that are within one or two hops distance. The assumption is that each node is aware of all other nodes (e.g., has the node ID of the other nodes) within a two-hop neighborhood. Since each node is using the same pseudo random number generation function to determine the random numbers, each node will come up with a consistent random value for each of the nodes within the two-hop neighborhood. Once a set of values is computed, the node with the highest value transmits during the timeslot.

In one particular example of determining random values, in timeslot 1, the first node 12a is determined to have a value of 4, the second node 12b is determined to have a value of 8, the third node 12c is determined to have a value of 1, the fourth node 12d is determined to have a value of 7 and the fifth node 12e is determined to have a value of 3. Since the second node 12b has the highest value, the second node is the only node that transmits during timeslot 1.

In timeslot 2, the first node 12a is determined to have a value of 3, the second node 12b is determined to have a value of 5, the third node 12c is determined to have a value of 4, the fourth node 12d is determined to have a value of 9 and the fifth node 12e is determined to have a value of 7. Since the fourth node 12d has the highest value, the fourth node is the only node that transmits during time slot 2.

In timeslot 3, the first node 12a is determined to have a value of 2, the second node 12b is determined to have a value of 1, the third node 12c is determined to have a value of 6, the fourth node 12d is determined to have a value of 3 and the fifth node 12e is determined to have a value of 5. Since the third node 12c has the highest value, the third node is the only node that transmits during time slot 3.

In timeslot 4, the first node 12a is determined to have a value of 4, the second node 12b is determined to have a value of 5, the third node 12c is determined to have a value of 2, the fourth node 12d is determined to have a value of 7 and the fifth node 12e is determined to have a value of 8. Since the fifth node 12e has the highest value, the fifth node is the only node that transmits during time slot 2.

FIG. 2 includes a table 20 indicating a transmit schedule for the nodes during the four timeslots in the preceding example. The resulting schedule from the election process achieves a collision-free schedule by allowing only one node to transmit (within one- or two-hop neighbors) during each timeslot.

Figure 3:
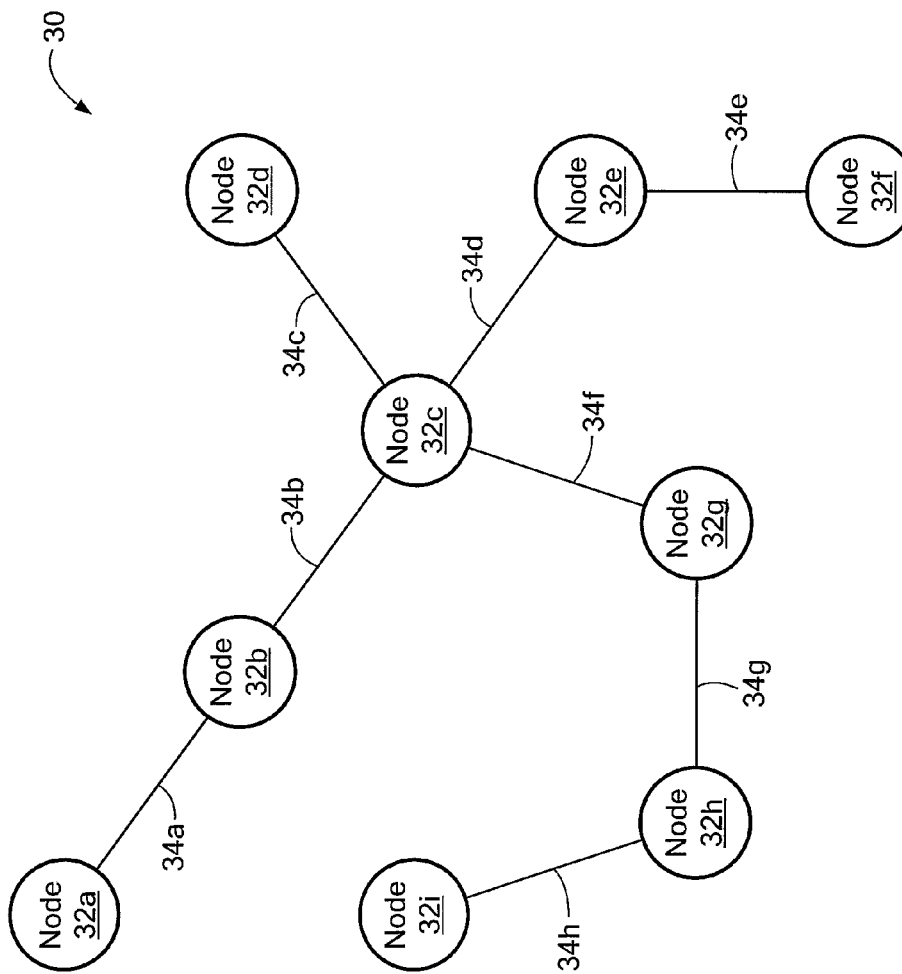
FIG. 3 is a prior art diagram of another communications network.

However, even using the NAMA technique, collisions may still occur if nodes are unaware of the other nodes. For example, referring to FIG. 3, a communications network 30 includes nodes (e.g., a first node 32a, a second node 32b, a third node 32c, a fourth node 32d, a fifth node 32e, a sixth node 32f, a seventh node 32g, an eighth node 32h and a ninth node 32i). The nodes 32a-32i are connected by links (e.g., a first link 34a connecting the first node 32a to the second node 32b; a second link 34b connecting the second node 32b to the third node 32c; a third link 34c connecting the third node 32c to the fourth node 32d; a fourth link 34d connecting the fourth node 32d to the fifth node 32e; a fifth link 34e connecting the fifth node 32e to the sixth node 32f; a sixth link 34f connecting the third node 32c to the seventh node 32g; the seventh link 34g connecting the seventh node 32g to the eighth node 32h; and the eighth link 34h connecting the eighth node 32h to the ninth node 32i).

In this example, the third node 32c has a neighborhood list (e.g., one-hop and two-hop neighbors) that includes the first node 32a, the second node 32b, the fourth node 32d, the fifth node 32e, the sixth node 32f, the seventh node 32g and the eighth node 32h. The ninth node 32i is not in the neighborhood list of the third node 32c because the eighth node is more than two hops away from the third node. The sixth node 32f only includes the fifth node 32e on its neighbor list, in this example. The sixth node 32f is missing the third node 32c (a two-hop neighbor) in its neighbor list. The sixth node 32f has view of the network topology that is inconsistent with the true topology of the network where the third node 32c and the sixth node 32f are two-hop neighbors.

Due to this inconsistency of the sixth node 32f not having the correct network topology, collisions can occur. In particular, using the NAMA technique, each node 32a-32i determines and evaluates the output of a random number function. For example, the first node 32a is determined to have a value of 4, the second node 32b is determined to have a value of 5, the third node 32c is determined to have a value of 9, the fourth node 32d is determined to have a value of 2, the fifth node 32e is determined to have a value of 6, the sixth node 32f is determined to have a value of 7, the seventh node 32g is determined to have a value of 2, the eighth node 32h is determined to have a value of 1 and the ninth node 32i is determined to have value of 8. The sixth node 32f determines that it can transmit during the timeslot since it has the highest output among its two-hop neighbors which only includes the fifth node 32e. Since the third node 32c also determines that it can transmit during the timeslot, the transmission from the third node 32c collides with a transmission from the sixth node 32f at the fifth node 32e.

It is therefore desirable in NAMA scheduling for each node to have a consistent view of the network in order to guarantee collision-free schedules. In contrast to prior art approaches, the description below focuses on an approach to improve network scheduling.

In a dynamic network, a consistency may be achieved by constantly exchanging control information among one-hop neighbors. The control information used in establishing consistency in NAMA scheduling includes at least the node ID of the originator and the node IDs of all the one-hop neighbors of the originator. Upon receiving control information, each node can build up a comprehensive list of neighbors using the node ID of the originator (which becomes one-hop neighbors of the receiver) and node IDs of the one-hop neighbors (which become two-hop neighbors of the receiver).

A virtual timeslot (VSLOT) technique improves consistency. The VSLOT technique offers a mechanism through which two nodes that may not share a consistent network topology view can reconcile the difference by listening to each other's neighbor information through timeslots referred to as "virtual timeslots." Unlike the prior art, in the VSLOT technique, the NAMA scheduling is used in scheduling control timeslots. Control timeslots are timeslots in which control information is sent.

One advantage of using the technique of NAMA scheduling for control timeslots comes from the more efficient utilization of the bandwidth since there will be at least one node scheduled to transmit for each timeslot but in the original timeslot many timeslots can go unused. For example, the prior approach is to allocate a group of slots (called a signal section) for exchanging network topology information (or simply neighbor information). Each node in the network randomly picks a slot within each signal section to transmit neighbor information. For each node to have an acceptable probability of transmitting its neighbor information collision-free, the algorithm requires pre-allocation of a large signal section (up to 200 slots for 25 node networks. There are several problems with the prior approach. First, the approach requires a prior knowledge of the theoretical maximum network size in order to allocate a large enough signal section. For networks smaller than the maximum size, slot access is highly inefficient. For networks of greater size, network performance suffers as the probability of collisions increase. Second, since the algorithm utilizes only one slot per node out of the total allocated signal section, the majority of slots in the signal section go unused, even when the network size reaches the assumed maximum. Thirds, the approach does not exploit the fact that over time a portion of the nodes in the network will reach consistency and be able to schedule neighbor information using the NAMA scheduling rather than randomly picking slots.

Figures 4, 5:
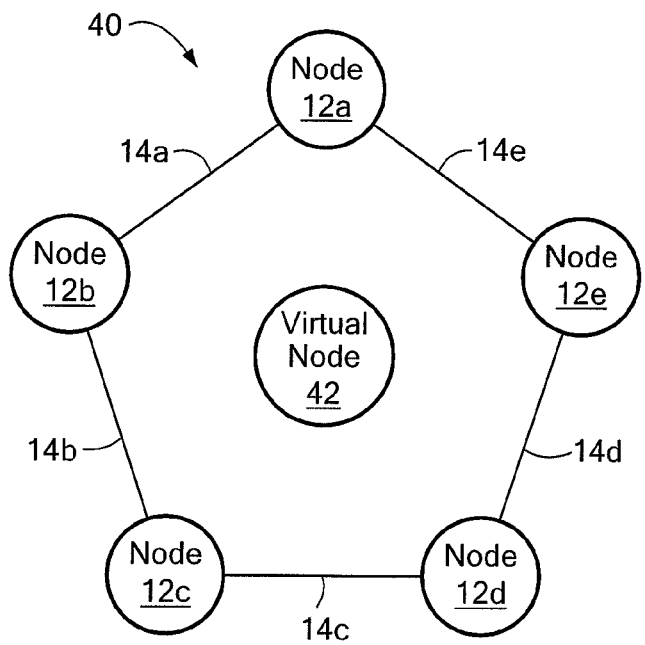
FIG. 4 is a diagram of a communications network having a virtual node and a new node joining the network.
FIG. 5 is a table indicating an example of network schedule of communications between the nodes of FIG. 4.

The election process using the VSLOT technique is illustrated in FIG. 4. Applying the NAMA scheduling, the network topology shown in FIG. 4 will be reflected in each node's neighbor list where all five nodes 12a-12e will belong to the list of either one- or two-hop neighbors of every other node. In addition to its normal NAMA neighbor list, in the VSLOT technique, each node has a virtual node 42 as its one-hop neighbor. The virtual node 42 is an imaginary node that does not exist in the network 40 but only exists in the neighbor list (e.g., a table) of each node and used for the purpose of scheduling the virtual timeslots. In one example, a virtual node 42 may be any type of information that is "a priori" shared by each node 12a-12e participating in NAMA scheduling such that each node can converge on a timeslot(s) during which all nodes that are participating in the scheduling stay in a receive mode if the neighbor information is consistent.

Having included the virtual node 42 in its neighbor list, each node 12a-12e determines the output of the pseudo-random function for all one/two-hop neighbors along with the virtual node during each timeslot. If a virtual node is elected for a timeslot (a virtual timeslot (VSLOT)), all of the neighboring nodes that are within one and two hops will be in the receive mode during that virtual timeslot. For nodes that have reached topology consistency, the virtual timeslot will be consistent among all the participating nodes.

Referring to FIG. 5, the NAMA technique may be used to generate random numbers associated with each node 12a-12e and the virtual node 42. For example, in timeslot 1, the first node 12a is determined to have a value of 4, the second node 12b is determined to have a value of 8, the third node 12c is determined to have a value of 1, the fourth node 12d is determined to have a value of 7, the fifth node 12e is determined to have a value of 3 and the virtual node 42 is determined to have a value of 5. Since the second node 12b has the highest value, the second node is the only node that transmits during timeslot 1.

In timeslot 2, the first node 12a is determined to have a value of 3, the second node 12b is determined to have a value of 5, the third node 12c is determined to have a value of 4, the fourth node 12d is determined to have a value of 9, the fifth node 12e is determined to have a value of 7 and the virtual node 42 is determined to have a value of 1. Since the fourth node 12d has the highest value, the fourth node is the only node that transmits during timeslot 2.

In timeslot 3, the first node 12a is determined to have a value of 2, the second node 12b is determined to have a value of 1, the third node 12c is determined to have a value of 6, the fourth node 12d is determined to have a value of 3, the fifth node 12e is determined to have a value of 5 and the virtual node 42 is determined to have a value of 8. Since the virtual node has the highest value, no node transmits during time slot 3. The timeslot 3 becomes the virtual timeslot (VSLOT) where each node 12a-12f is in the receive mode.

In timeslot 4, the first node 12a is determined to have a value of 4, the second node 12b is determined to have a value of 5, the third node 12c is determined to have a value of 2, the fourth node 12d is determined to have a value of 7, the fifth node 12e is determined to have a value of 8 and the virtual node 42 is determined to have a value of 6. Since the fifth node 12e has the highest value, the fifth node is the only node that transmits during timeslot 4.

NAMA scheduling requires consistency in the network topology view among the participating nodes for the scheduling to work correctly. For a node that is newly joining the network (e.g., a node recently powered up, a node belonging to another network connecting to the network), if the new node immediately participated in NAMA scheduling, the new node will persistently disrupt the ongoing data exchange of the nodes established in the network since the new node will never have an opportunity to learn the presence of other nodes in the vicinity. For example, for a new node that is just powered on, in its view, there is only one node, which is itself, in the network. Using NAMA scheduling on control timeslots, the new node schedules itself to transmit neighbor information for all the allocated control timeslots thus preventing it from hearing the control information of other nodes that may be present in the range (e.g., wireless) of the new node. In order for the new node to break out of this scheduling mode (where it schedules itself all the time), there needs to be opportunities for the new node to receive control information of other nodes in the vicinity as well as for the neighboring nodes to learn of the presence of newly joining node. The VSLOT technique provides these opportunities (or timeslots) by employing the notion of a virtual node to schedule receive-only timeslots called "virtual timeslots" (VSLOT).

The VSLOT technique uses the inherent characteristics of NAMA scheduling where inconsistency in topology information will result in inconsistent NAMA schedules. When there is inconsistency in the schedule, a virtual timeslot of one node will overlap with control information transmission of another node creating the opportunity for each node to reconcile the inconsistency. However, for nodes that have inconsistent topology information (e.g., newly joining node), the virtual timeslot of one node will be different than that of other nodes with different topology information. A virtual timeslot of one node will overlap with a control information transmission of another node that has inconsistent topology information, giving each node an opportunity to reconcile the difference. Thus, when there is inconsistency in topology information, virtual timeslots become opportunities for the nodes in the network to learn of new nodes that may not share the same topology information.

Figures 6, 7:
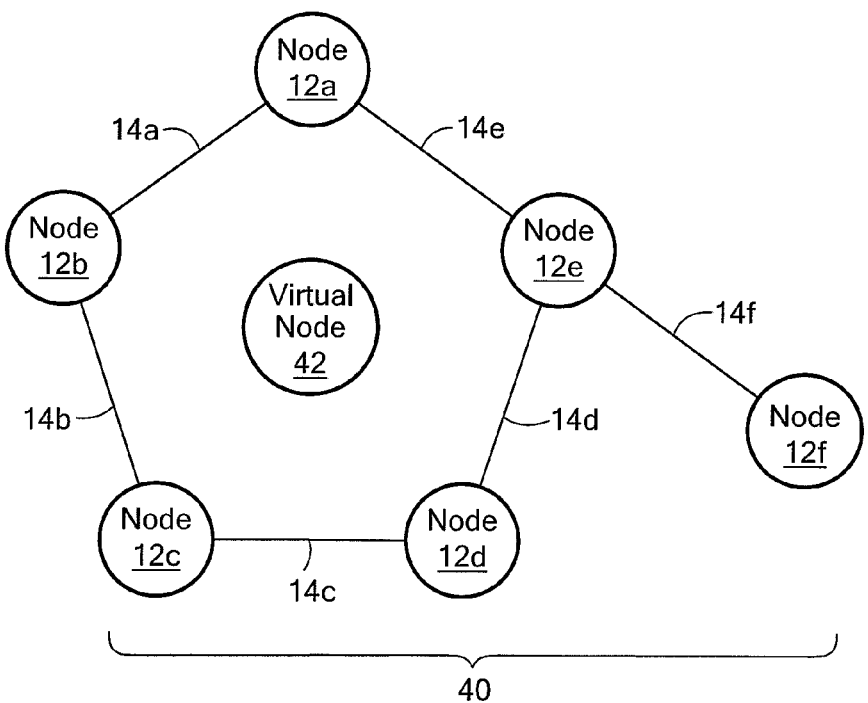
FIG. 6 is another diagram of a communications network having a virtual node.
FIG. 7 is a table indicating an example of initial network schedule of communications between the nodes of FIG. 6.

The exchange of the control information that occurs during virtual timeslots is shown in FIG. 6. In FIG. 6, an existing network 40 includes nodes 12a-12e and is joined by a new node, a sixth node 12f that has no knowledge of any neighboring nodes. The sixth node 12f schedules its control timeslots by including itself and the virtual node 42 for the NAMA election process.

An initial schedule of the timeslots 60 is reflected in FIG. 7. According to the initial schedule 60, the sixth node includes a virtual timeslot location in timeslot 1 and in timeslot 4 that is inconsistent from that of nodes 12a-12e which include a virtual timeslot location in timeslot 3. The inconsistency occurs because the sixth node 12f does not share the same network topology information as the nodes 12a-12e. This inconsistency causes the virtual timeslot (timeslot 3) for the fifth node 12e to overlap with the control information transmission from the sixth node 12f. Because of the overlap, the sixth node 12f will be able to listen to the control information transmitted by the fifth node 12e during the virtual timeslots (timeslot 1 and timeslot 4) of the sixth node 12f. Likewise, the fifth node 12e will also be able to listen to the transmission of the sixth node 12f during the virtual timeslot (timeslot 3) of the fifth node 12e. Having received each other's control information, each node 12a-12f will be able to come to a consistent schedule in which case the sixth node 12f will be a part of network 40.

Figures 8, 9:
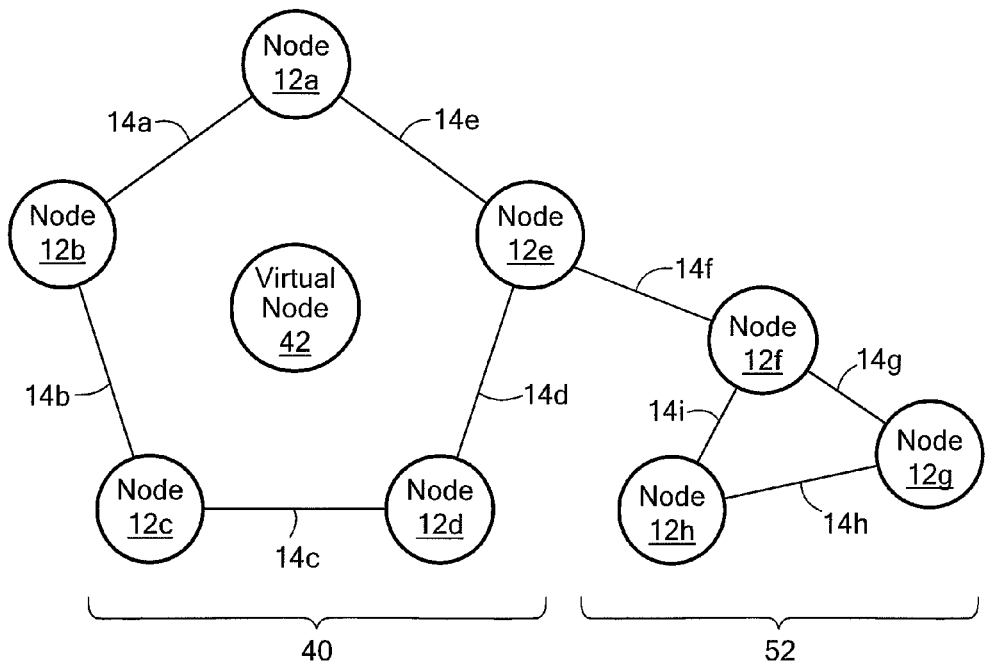
FIG. 8 is a further diagram of a communications network having a virtual node and a second communications network joining the communications network having the virtual node.
FIG. 9 is a table indicating an example of initial network schedule of communications between the nodes of FIG. 8.

Referring to FIG. 8, in another example, a network merge of a network 52 including a sixth node 12f, the seventh node 12g and the eighth node 12h with the network 40 goes through the similar mechanism as in the example shown in FIG. 6. When the network 40 and the network 52 come into range (e.g., wireless) of each other, much of their control information transmission will result in collisions since the existing schedules have been formulated without regard for the other network (see, for example, an initial schedule 70 in FIG. 9). The inconsistency in each network's network topology view will cause the virtual timeslots for the fifth node 12e and the sixth node 12f to overlap with one another's control information transmission. The overlap will allow each network 40, 52 to eventually learn the presence of each other. Having received the control information from each other, the two networks 40 and 52 can merge and generate consistent schedules that fully incorporate the merged networks.

Figure 10:
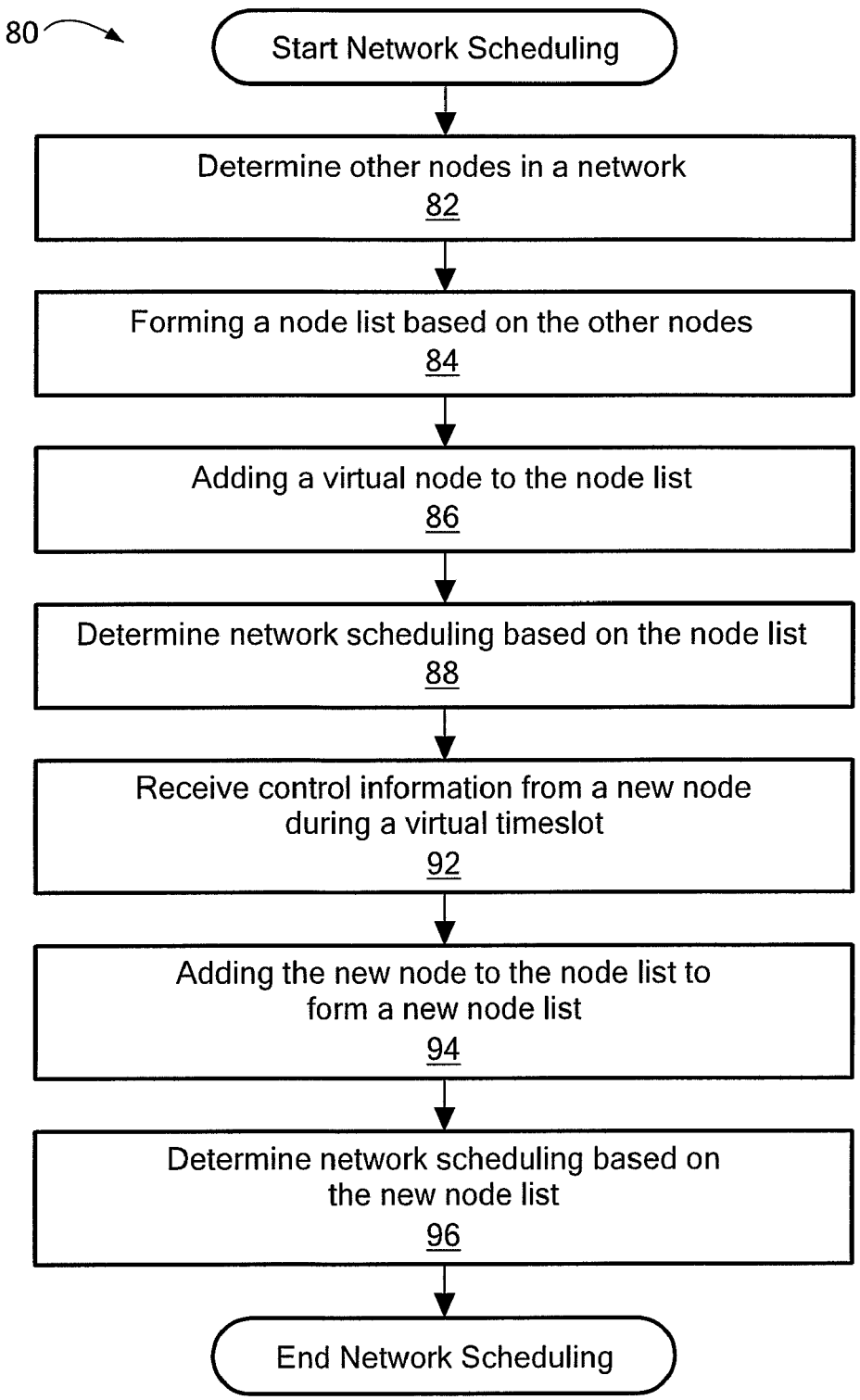
FIG. 10 is a flowchart of an example of a process to schedule network communications.

FIG. 10 depicts a flowchart for a process 80 which is an example of a process for network scheduling. In one example, each node 12a-12e performs process 80. Process 80 includes determining other nodes in a network (82). In one example, determining nodes includes determining one-hop neighbors. In another example, determining nodes includes determining one-hop and two-hop neighbors. Other examples may include determining greater than two-hop neighbors.

Process 80 forms a node list based on the other nodes (84) and adds a field associated with a virtual field (86). In one example, the node list is included in one or more lists (not shown). In another example, the node list is included in one or more tables (not shown). Process 80 determines network scheduling based on values stored in the node list (88). In one example, the values may be node IDs. In one example, the network scheduling is determined using the NAMA technique. In another example, the network scheduling is determined using a random number function with the Node IDs as a seed for the random number function. In one example, the processing block 88 determines the virtual timeslot (VSLOT) for which each of the nodes are in a receive mode.

Process 80 receives control information from a new node during the virtual timeslot (VSLOT) (92). Process 80 adds the new node to the node list to form a new node list (94). Process 80 determines network scheduling based on the new node list (96).

In another technique described herein, efficient utilization of bandwidth among participating nodes is achieved by allowing nodes that are just entering the network (e.g., during power up, moving within wireless range of a network and so forth) to gain knowledge of the current network state through unique slots called "network entry control timeslots" as will be further described below. By using network entry control timeslots, nodes with minimal knowledge of the existing state can quickly gain the current transmission and reception schedules and readily participate in the scheduling activities without causing interruption to the on-going communication. The efficient sharing of bandwidth is achieved among an arbitrary number of participating nodes by combining Carrier Sense Multiple Access (CSMA) scheduling with NAMA. CSMA transmits data during a timeslot based on a probability.

By restricting nodes with minimal knowledge of the current state to use a CSMA scheme, which requires no prior knowledge of the current state, in accessing network entry control timeslots, newly powered up nodes or nodes that have just recently entered into an existing network will not disrupt the ongoing network scheduling activities, but still be able to exchange information through the network entry control timeslots. Once enough information is collected and distributed, the new nodes can then start to participate in the scheduling activity using NAMA and allow the network entry control timeslots to be utilized by other nodes that will be entering the network in the future.

In one example, the technique described herein provide a generic scheduling algorithm which can be applied to any hardware, software, or any other communication entities including human participants where a coordination of communication is necessary over a shared medium.

Figure 11:
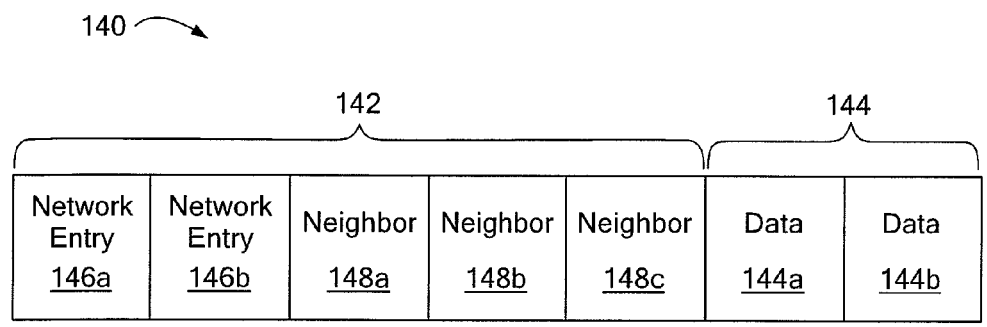
FIG. 11 is a diagram of timeslots.

Referring to FIG. 11, TDMA timeslots 140 are divided into control timeslots 142 and data timeslots (e.g., data timeslot 144a, data timeslot 144b). The control timeslots 142, during which control information is exchanged, include network entry control timeslots (e.g., a network entry timeslot 146a and a network entry timeslot 146b) and neighbor control timeslots (e.g., neighbor control timeslots 148a-148c). Although both the network entry control timeslots 146a, 146b and the neighbor control timeslots 148a-148c are used in exchanging control information, the difference between the two types of timeslots comes from the way each timeslot is scheduled. The neighbor control timeslots 148a-148c are scheduled using the NAMA scheduling described above (see, for example, FIGS. 1 and 2). Thus, nodes that can transmit during neighbor control timeslots 148a-148c, require tight consistency in network topology in order to prevent collisions.

On the other hand, for network entry control timeslots 146a, 146b, CSMA is used in exchanging control information. CSMA, which is scheduled based on a pseudo-random probability, p, does not require any consistency among the nodes which participate in the scheduling. Thus, data transmissions during a network entry timeslot 146a, 146b will be collision-prone. However, since only the nodes with consistency in network topology above a certain degree are allowed to transmit during the neighbor control timeslots 148a-148c, the collisions will be isolated to the network entry control timeslots 146a, 146b and any disruption to the exchange of control information during the neighbor control timeslots 148a-148c will be minimized. This discrimination of access during control timeslots 142 prevents a newly joining node (which usually has minimal information about the existing network) from disrupting timeslot schedules due to inconsistency in network topology. Also, a newly joining network is allowed to first slowly reach a certain degree of consistency through exchange of control information during network entry control timeslots 146a, 146b before the newly joining networks can access the neighbor control timeslots 148a-148c where the majority of the control information exchange occurs.

Figure 12:
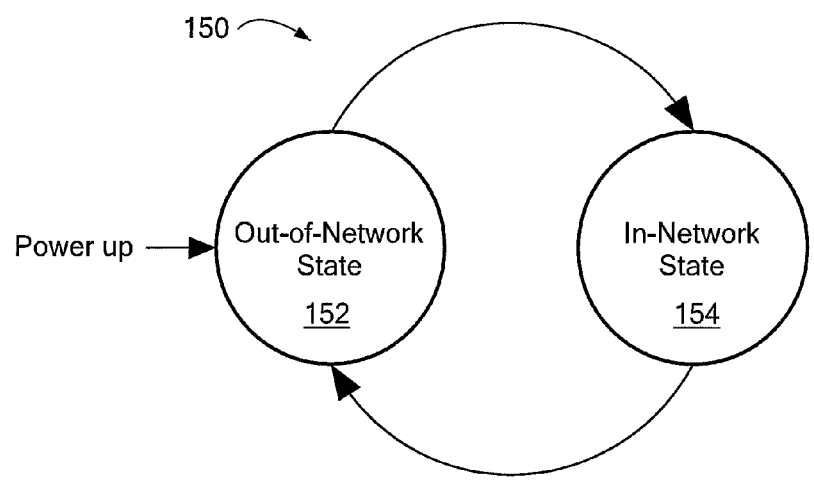
FIG. 12 is a state-machine diagram for a node.

Referring to FIG. 12, nodes 112a-112f (FIG. 14) each operates in two distinct states, an out-of-network state 152 and an in-network state 154, with each state 152, 154 having a different probability of accessing network entry control timeslots 146a, 146b and neighbor control timeslots 148a-148c, respectively. When a new node first powers up, it will first move into the out-of-network state 152 and transmits its control information during the network entry control timeslots 146a, 146b with the probability of transmission equal to a predetermined value, for example, 0.25. Initially, the control information transmitted by the node will contain the node ID of itself since it has not yet learned the presence of any other nodes in the network. The node will eventually be able to learn about other nodes (if there are any) in the network by listening during the neighbor control timeslots 148a-148c for which the node will remain in receive mode. By listening to neighbor control timeslots 48a-48c for information of other nodes in the neighborhood, the new node detects how many direct one-hop neighbors exist and whether those one-hop neighbors have heard from the new node (i.e., a form of acknowledgement).

The ratio between the number of one-hop neighbors that a node has detected and the number of one-hop neighbors that have acknowledged the presence of the node is the metric used in determining the degree of consistency. When the ratio becomes more than a predetermined percentage (e.g., about 50%), the new node transitions into the in-network state 154 where it will remain until the ratio becomes less than the predetermined percentage. Once the node transitions to the in-network state 154, the node transmits its control information during the network entry control timeslots 146a, 146b with the probability equal to 1/n. In one example, "n" is the number of one- and two-hop neighbors of the node. In another example, n is the number of one-hop neighbors. In the in-network state 154, the new node participates in normal NAMA scheduling for access to the neighbor control timeslots 148a-148c based on its one- and two-hop neighborhood information and also fully participates in the exchange of data during data timeslots 144a, 144b.

Figure 13:
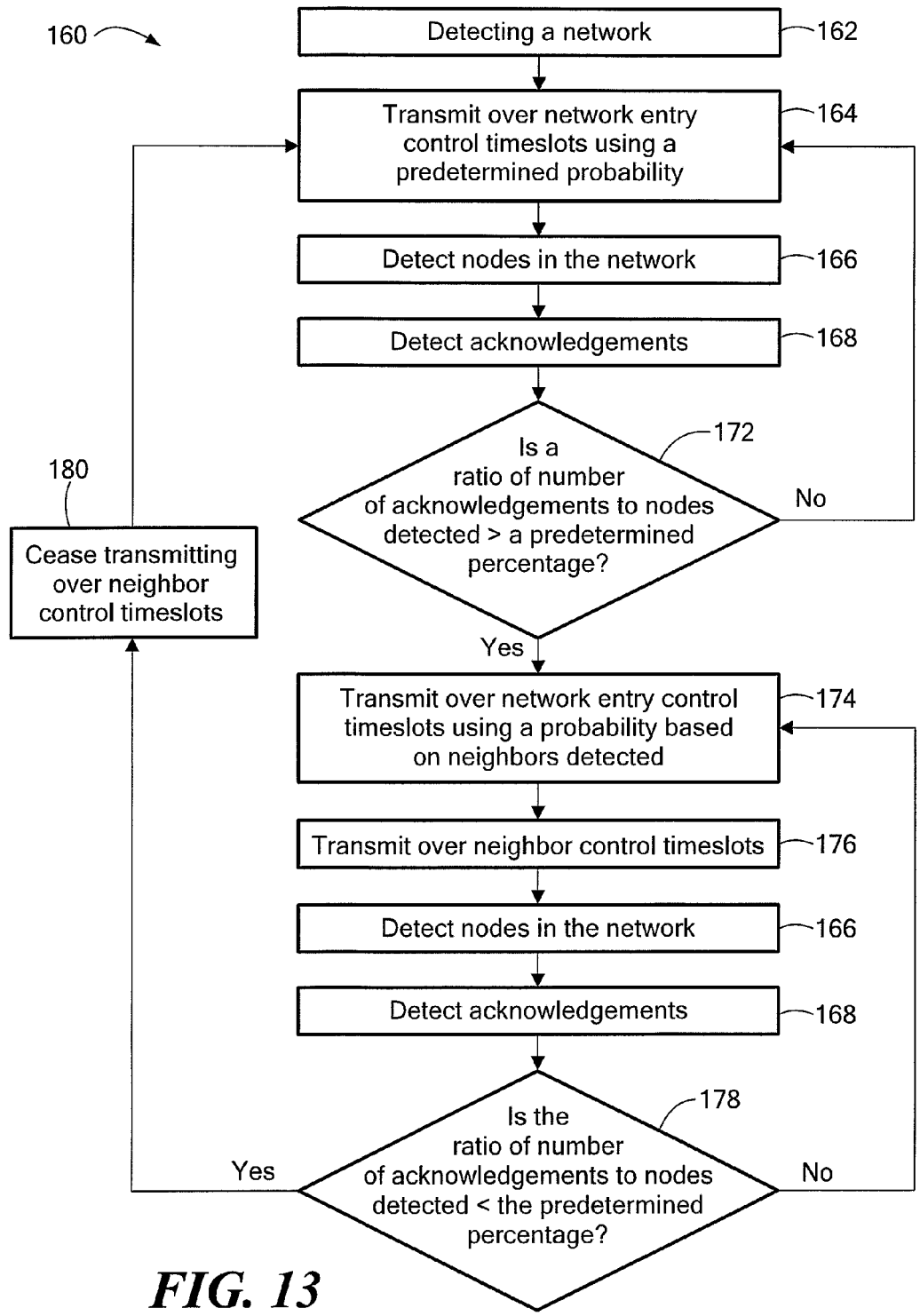
FIG. 13 is a flowchart of an example of a process to schedule network communications.

FIG. 13 is a flowchart for a process 160 which is an example of a process for network scheduling. In one example, each node 12a-12e performs process 160. The new node detects a network (162). In one example, a new node powers up and detects the network. In another example, a new node is entering the wireless range of at least one node in the network. The new node transmits control information over network entry control timeslots 146a, 146b using a fixed probability (164). For example, the new node transmits using CSMA.

The new node detects nodes in the network (166). For example, the new node receives data from the other nodes during the neighbor control timeslots 148a-148c. The new node detects acknowledgements from the other nodes (168). For example, the new node detects acknowledgments from one-hop neighbors.

If the ratio of the number of acknowledgments to nodes detected is greater than a predetermined percentage (172), the new node transmit over network entry control timeslots using a probability based on the neighbors detected (174). For example, the probability based on the neighbors detected is 1/n. In one example, the ratio is the number of acknowledgements from one-hop neighbors to the number of one-hop neighbors detected.

The new node transmits over neighbor control timeslots 148a-148c (176). For example, the transmission over neighbor control timeslots 148a-148c is performed using NAMA scheduling.

The new node continues to detect nodes in the network (166) and detect acknowledgments (166). If the ratio of the number of acknowledgments to nodes detected is below the predetermined percentage (178), the new node ceases transmitting during neighbor control timeslots (180) and returns to transmitting over the network entry control timeslots at the predetermined probability (164).

Referring to FIG. 14, by using process 160, a new node 12f which just has entered the wireless range of network 140 will learn the existence of network 140 by receiving control information transmitted by node 12e during a neighbor control timeslot 148a-148c. Likewise, node 12e learns of the existence of node 12f through the transmission of control information by node 12f during a network entry timeslot 146a, 146b. Having heard of each other's control information, both nodes 12e, 12f will be able to construct consistent NAMA schedules using the newly learned neighbor information.

An initial network schedule 190 of the control timeslots for the nodes 12a-12f in FIG. 15. According to the initial network schedule 190, the new node 12f transmits during the network entry control timeslots 146a, 146b based on a predetermined probability for each slot while the nodes 12a-12e of the network 140 receive data during the network entry timeslots 146a, 146b. During the neighbor control timeslots 148a-148c, the nodes 12a-12f transmit based on NAMA scheduling while the new node 12f receives control data. Having received each other's control information, each node 12a-12f will be able to come to a consistent schedule in which case the new node 12f becomes a part of network 40.

Figure 16:
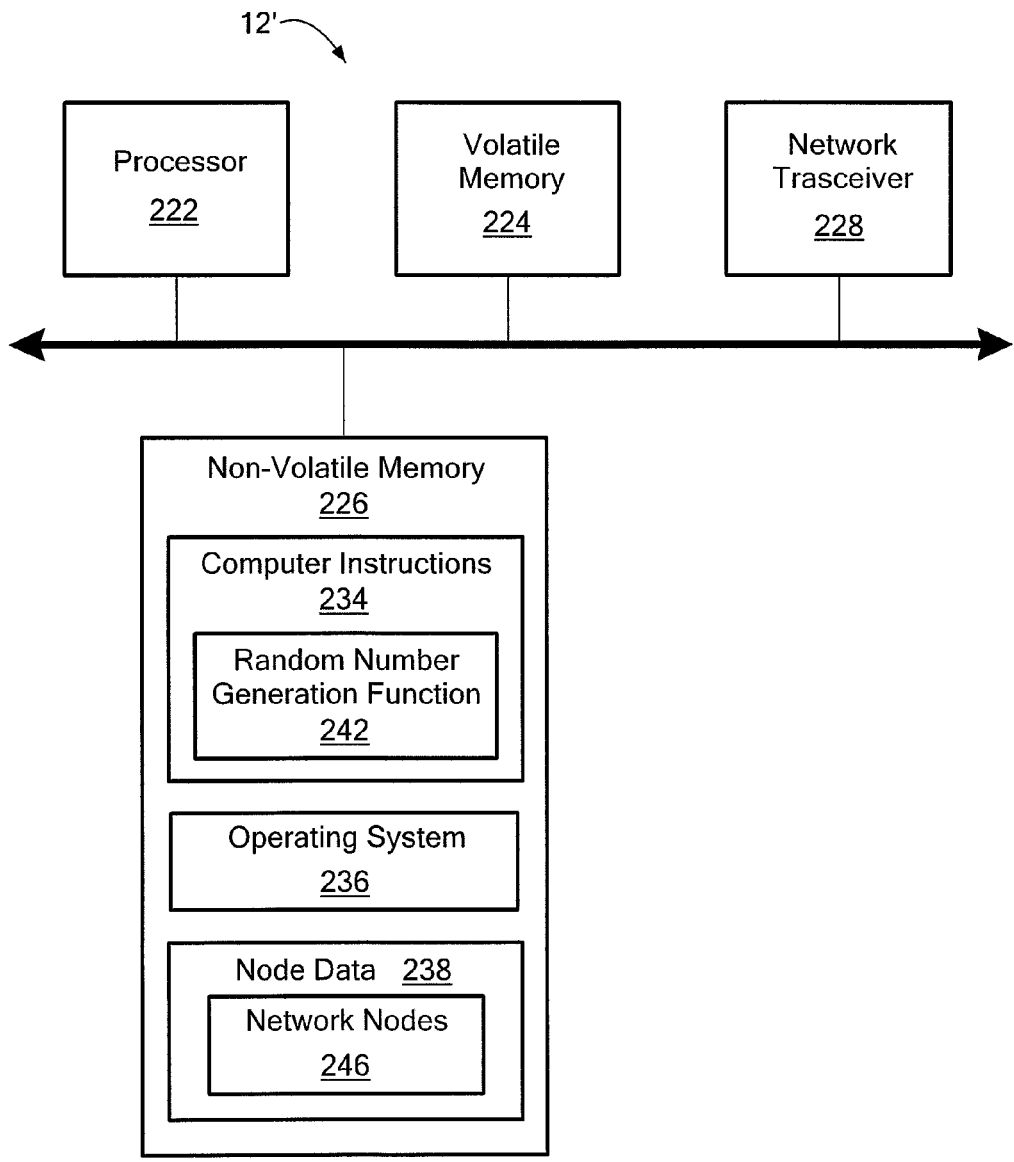
FIG. 16 is a block diagram of an example of a network node on which the processes of FIGS. 10 and 13 may be implemented.

Referring to FIG. 16, one or more of the nodes 12a-12e may be configured as a network node 12', for example. The network node 12' includes a processor 222, a volatile memory 224, a non-volatile memory 226 (e.g., hard disk) and a network transceiver 228. The non-volatile memory 226 stores computer instructions 234, an operating system 236 and node data 238. The computer instructions 234 include a random number generation function 242. The node data 238 includes network nodes data 246. In one example, the network data 246 includes virtual node data to be used to implement process 80. In one example, the node data 238 is stored in a list (not shown). In another example, the node data 238 is stored in tables (not shown). The transceiver 228 is used to communicate with the other network nodes. In one example, the computer instructions 234 are executed by the processor 222 out of volatile memory 224 to perform at least one of process 80 and process 160.

The processes described herein (e.g., process 80 and process 160) are not limited to use with the hardware and software of FIG. 16; it may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the processes and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 80. Process 80 may also be implemented as a machine-readable storage medium, configured with a computer program, where upon execution, instructions in the computer program cause the computer to operate in accordance with the processes (e.g., process 80 and process 160).

The processes described herein are not limited to the specific embodiments described herein. For example, determining the virtual timeslot does not necessarily require a virtual node. In another example, the processes 80 and 160 are not limited to the specific processing order of FIGS. 10 and 13, respectively. Rather, any of the processing blocks of FIGS. 10 and 13 may be re-ordered, combined or removed, performed in parallel or in serial, as necessary, to achieve the results set forth above.

The processing blocks in FIGS. 10 and 13 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A method to schedule network communications comprising:
    transmitting a node identification associated with a first node joining a network over a first portion of control timeslots based on a first probability;
    detecting nodes in the network using a second portion of the control timeslots;
    receiving acknowledgments from at least one of the nodes in the network; and
    if a ratio of a number of acknowledgments received to a number of the nodes in the network detected is greater than a predetermined percentage:
        transmitting control data over the first portion of the control timeslots based on a second probability associated with a number of the nodes detected; and
        transmitting data over the second portion of the control timeslots based on a network schedule.

2. The method of claim 1 wherein transmitting a node identification associated with a first node joining a network comprises transmitting a node identification associated with a first node powering up.

3. The method of claim 1 wherein transmitting a node identification associated with a first node joining a network comprises transmitting a node identification associated with a first node entering a wireless range of the network.

4. The method of claim 1 wherein receiving acknowledgments comprises receiving acknowledgments from one-hop neighbors.

5. The method of claim 4 wherein the ratio comprises a number of acknowledgments received from one-hop neighbors to one-hop neighbors detected.

6. The method of claim 1 wherein transmitting control data over the first portion of the control timeslots based on a second probability associated with a number of the nodes detected comprises transmitting control data over the first portion of the control time slots based on a probability of 1/n, where n comprises the number of one-hop neighbors.

7. The method of claim 6 wherein n comprises the number of one-hop and two-hop neighbors.

8. The method of claim 1 wherein transmitting data over the second portion of the control timeslots based on a network schedule comprises transmitting data over the second portion of the control timeslots based on a network schedule using a Node Activation Multiple Access (NAMA) algorithm.

9. The method of claim 1 wherein a predetermined percentage is about 50%.

10. The method of claim 1, further comprising, if the ratio of the number of acknowledgments received to the number of the nodes in the network detected is below the predetermined percentage, transmitting control data over the first portion of the control timeslots based on the fixed probability.

11. The method of claim 10, further comprising, if the ratio of the number of acknowledgments received to the number of the nodes in the network detected is below the predetermined percentage, cease transmitting over the second portion of the control timeslots.

12. An article comprising a non-transitory machine-readable medium that stores executable instructions to schedule network communications, the instructions causing a machine to:
    transmit a node identification associated with a first node joining a network over a first portion of control timeslots based on a first probability;

detect nodes in the network using a second portion of the control timeslots;

receive acknowledgments from at least one of the nodes in the network;

transmit control data over the first portion of the control timeslots based on a second probability associated with a number of the nodes detected if a ratio of a number of acknowledgments received to a number of the nodes in the network detected is greater than a predetermined percentage; and transmit data over the second portion of the control timeslots based on a network schedule if the ratio of the number of acknowledgments received to the number of the nodes in the network detected is greater than the predetermined percentage.

13. The article of claim 12 wherein instructions causing a machine to transmit a node identification associated with a first node joining a network comprises instructions causing a machine to transmit a node identification associated with a first node powering up.

14. The article of claim 12 wherein instructions causing a machine to transmit a node identification associated with a first node joining a network comprises instructions causing a machine to transmit a node identification associated with a first node entering a wireless range of the network.

15. The article of claim 12 wherein instructions causing a machine to receive acknowledgments comprises instructions causing a machine to receive acknowledgments from one-hop neighbors.

16. The article of claim 15 wherein the ratio comprises a number of acknowledgments received from one-hop neighbors to one-hop neighbors detected.

17. The article of claim 12 wherein instructions causing a machine to transmit control data over the first portion of the control timeslots based on a second probability associated with a number of the nodes detected comprises instructions causing a machine to transmit control data over the first portion of the control time slots based on a probability of 1/n, where n comprises the number of one-hop neighbors.

18. The article of claim 12 wherein instructions causing a machine to transmit data over the second portion of the control timeslots based on a network schedule comprises instructions causing a machine to transmit data over the second portion of the control timeslots based on a network schedule using a Node Activation Multiple Access (NAMA) algorithm.

19. The article of claim 12, further comprising instructions causing a machine, if the ratio of the number of acknowledgments received to the number of the nodes in the network detected is below the predetermined percentage, to transmit control data over the first portion of the control timeslots based on the fixed probability.

20. The article of claim 19, further comprising, instructions causing a machine, if the ratio of the number of acknowledgments received to the number of the nodes in the network detected is below the predetermined percentage, to cease transmitting over the second portion of the control timeslots.

21. An apparatus to schedule network communications, comprising:

circuitry to:

transmit a node identification associated with a first node joining a network over a first portion of control timeslots based on a first probability;

detect nodes in the network using a second portion of the control timeslots;

receive acknowledgments from at least one of the nodes in the network;

transmit control data over the first portion of the control timeslots based on a second probability associated with a number of the nodes detected if a ratio of a number of acknowledgments received to a number of the nodes in the network detected is greater than a predetermined percentage; and transmit data over the second portion of the control timeslots based on a network schedule if the ratio of the number of acknowledgments received to the number of the nodes in the network detected is greater than the predetermined percentage.

22. The apparatus of claim 21 wherein the circuitry comprises at least one of a processor, a memory, programmable logic and logic gates.

23. The apparatus of claim 21 wherein the circuitry to transmit a node identification associated with a first node joining a network comprises circuitry to transmit a node identification associated with a first node powering up.

24. The apparatus of claim 21 wherein the circuitry to transmit a node identification associated with a first node joining a network comprises circuitry to transmit a node identification associated with a first node entering a wireless range of the network.

25. The apparatus of claim 21 wherein the circuitry to receive acknowledgments comprises circuitry to receive acknowledgments from one-hop neighbors.

26. The apparatus of claim 25 wherein the ratio comprises a number of acknowledgments received from one-hop neighbors to one-hop neighbors detected.

27. The apparatus of claim 21 wherein the circuitry to transmit control data over the first portion of the control timeslots based on a second probability associated with a number of the nodes detected comprises circuitry to transmit control data over the first portion of the control time slots based on a probability of 1/n, where n comprises the number of one-hop neighbors.

28. The apparatus of claim 21 wherein the circuitry to transmit data over the second portion of the control timeslots based on a network schedule comprises circuitry to transmit data over the second portion of the control timeslots based on a network schedule using a Node Activation Multiple Access (NAMA) algorithm.

29. The apparatus of claim 21, further comprising circuitry to, if the ratio of the number of acknowledgments received to the number of the nodes in the network detected is below the predetermined percentage, transmit control data over the first portion of the control timeslots based on the fixed probability.

30. The apparatus of claim 29, further comprising, circuitry to, if the ratio of the number of acknowledgments received to the number of the nodes in the network detected is below the predetermined percentage, cease transmitting over the second portion of the control timeslots.

31. A method to schedule communications in a network comprising:

detecting nodes in the network;

receiving acknowledgments from at least one of the nodes in the network;

separating control slots into a first portion and a second portion, each portion using a different scheduling scheme; and limiting transmission in the control slots by a node based on a network topology consistency for the node, wherein the network topology consistency is based on a number of the acknowledgments received and a number of the nodes in the network detected, wherein limiting comprises allowing a node with a lower network topology consistency than a predetermined network topology consistency to transmit only during the first portion of the control slots, wherein limiting comprises allowing a node with a network topology consistency equal to the predetermined network topology consistency to transmit on both the first portion and the second portion of the control slots.

32. The method of claim 31 wherein the first portion uses a random access scheduling scheme using a pseudo-random number generator.

33. The method of claim 32 wherein the second portion uses a Node Activation Multiple Access (NAMA) scheduling scheme based on topology information.

* * * * *